William Ord's Steam Valve.

74583

PATENTED
FEB 18 1868

Witnesses:
H. E. Askitts
Theo Tusche

Inventor:
Wm Ord
per
attorneys

United States Patent Office.

WILLIAM ORD, OF BROOKLYN, OHIO.

Letters Patent No. 74,583, dated February 18, 1868.

---

IMPROVEMENT IN STEAM-ENGINE VALVES.

---

The Schedule referred to in these Letters Patent and making part of the same.

---

TO ALL WHOM IT MAY CONCERN:

Be it known that I, WILLIAM ORD, of Brooklyn, in the county of Cuyahoga, and State of Ohio, have invented a new and improved Steam-Valve; and I do hereby declare that the following is a full, clear, and exact description thereof, which will enable those skilled in the art to make and use the same, reference being had to the accompanying drawings, forming part of this specification.

This invention relates to a new and improved construction of steam-engine valves, whereby they operate without sticking from the unequal expansion of the parts, and whereby the same are more easily adjusted and the wear from friction more economically provided against. It consists of the combination of a valve-stem with cylindrical segments or valves, and two wedges, with an intermediate key so arranged, in connection with a set-screw, that, by forcing the key between the wedges. the segments or valves are drawn together and the pressure against the valve-casing relieved.

Similar letters of reference indicate corresponding parts.

Figure 1:
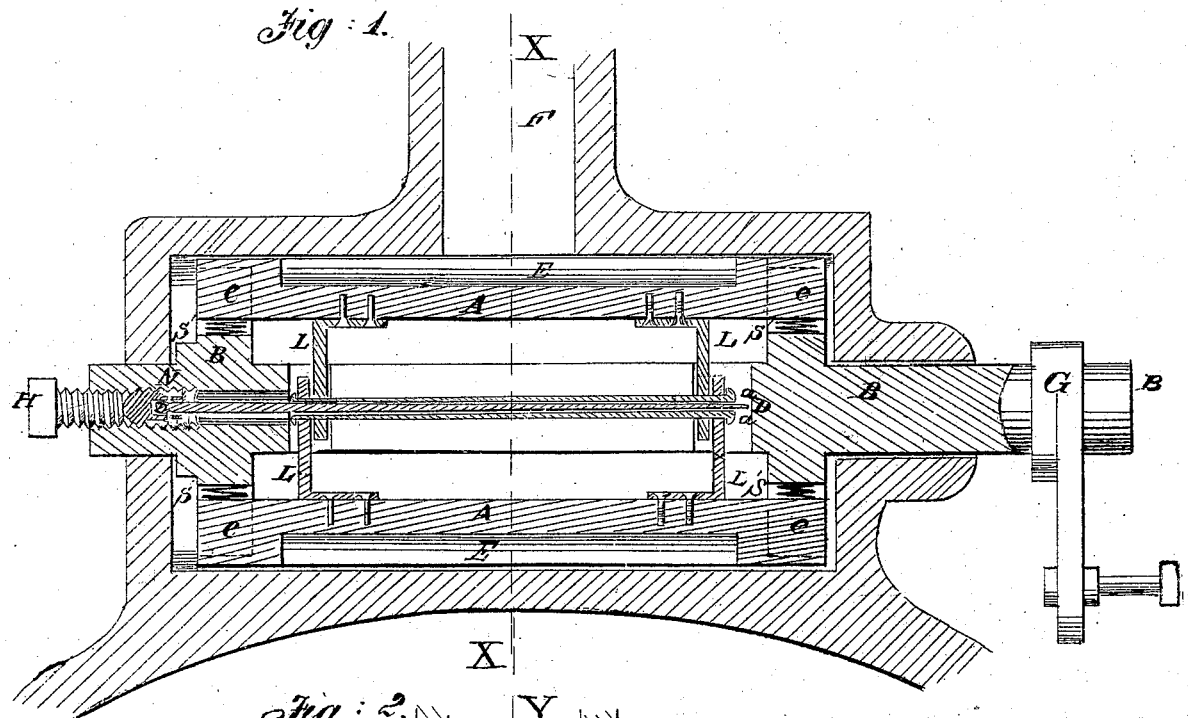
Figure 1 is a central horizontal section of the valve taken in the line $y\,y$, fig. 2, the valve-box or steam-chest being indicated by red lines.
Figure 2:
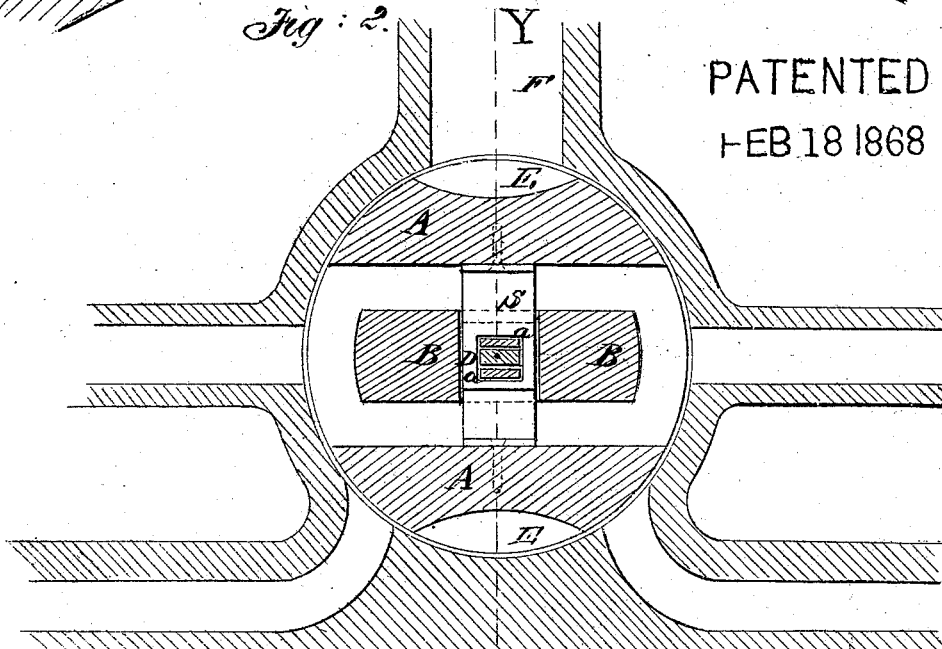
Figure 2 is a cross-section of the same, taken in the line $x\,x$, fig. 1.

A are two cylindrical segments or valves, having, on the outside, chambers E for the passage of the exhaust-steam. B is the valve-rod or stem having through it a slot, S, to receive the links L, the wedges $a$, and key D. $a$ are the wedges passing through the link L in the slot S, having their thinner end toward a set-screw, H. D is the key attached to the set-screw H, by its thicker end in such way that the screw H will turn upon the key D, moving it only in and out. E are exhaust-steam chambers. F, steam-pipe connecting with boiler. G is the crank by which the valve is turned in the case. H is the set-screw. S′, springs in the heads $e$, operating against the tenon on the valve A. $e$ are the heads or disks. The valve-stem B has upon each end a head or disk, and is continued on through these heads or disks $e$ in a journal, on which it turns, and by which it is moved or rocked by means of the crank, G. The valve-stem B is flatted on its opposite sides, and has also through its entire length, between the heads, the slot S, through which pass, crosswise, the links L, and lengthwise, the wedges $a$ and the key D. Between the heads or disks $e$ are two cylindrical segments or valves, A, placed opposite to each other and opposite to the flatted side of the valve-stem B, provided with a tenon which fits a slot in the heads or disks $e$, and by which it is kept in position. In the slot in the heads $e$ are springs, S′, which operate on the tenons on the valves A, intended to take up the slack when the steam is not on. Said valves A are also provided with a chamber, E, for the escape of the exhaust steam. Said segments or valves A are also provided with the links L, which are either a part of the valve A, or attached to the same by screws. The links of one valve lap by the links of the other valve, and pass crosswise through the slot S in the valve-stem B. These links L are provided with holes which do not quite correspond with each other, through which pass the wedges $a$ and the key D, in such a way that when the key D is forced inwards by the set-screw H passing through the end of the valve-stem B, the wedges $a$, by thus being forced apart, will draw together the valves A, thereby taking off any pressure of the same from the valve-case. The set-screw H is provided with a chamber, $n$, to receive the head of the key D, and upon which it turns.

The arrangement is such also as to admit of the entire valve being easily adjusted to the valve-case, and provides for the wearing of the segments or valves A by the friction of the same against the face of the valve-case. It may be attached to any steam-engine, and constitutes, as above described, a cheap, durable, and reliable steam-engine valve.

I claim as new, and desire to secure by Letters Patent—

1. The combination of the segments A, having chambers E, with the slotted stem B and heads $e$, substantially as set forth.
2. In combination with the above, I claim the links L, wedges $a$, and key D, substantially as specified.
3. In combination with the above, I claim the screw H and springs S, substantially as described.

WILLIAM ORD.

Witnesses:
C. H. BABCOCK,
GEO. J. DUNCAN.